United States Patent [19]

Zinnbauer

[11] 4,131,980
[45] Jan. 2, 1979

[54] METHOD OF MAKING A TANK

[76] Inventor: Frederick W. Zinnbauer, 23418 Cherryhill Rd., Dearborn, Mich. 48124

[21] Appl. No.: 831,249

[22] Filed: Sep. 7, 1977

[51] Int. Cl.² .............................................. B21D 39/02
[52] U.S. Cl. .................................... 29/463; 29/469.5; 29/509; 113/120 W; 113/120 Y; 220/1 V; 220/5 A; 220/78; 220/81 R
[58] Field of Search .................... 29/463, 469.5, 509; 113/120 Y, 120 QA, 120 S, 120 W; 220/1 V, 77, 78, 79, 81 R, 5 A; 228/137

[56] References Cited

U.S. PATENT DOCUMENTS

| 583,683 | 6/1897 | Gersant et al. | 113/120 Y UX |
| 797,793 | 8/1905 | Crane | 113/120 W UX |
| 845,760 | 3/1907 | Coffin | 29/463 UX |
| 1,699,434 | 1/1929 | Jordan | 228/137 X |
| 1,880,030 | 9/1932 | Wilson | 220/81 R X |
| 1,891,452 | 12/1932 | Schibsted | 220/81 R |
| 2,384,042 | 9/1945 | O'Brien | 220/78 X |
| 2,806,622 | 9/1957 | Leirer | 220/5 A |
| 3,921,848 | 11/1975 | Dalveck | 220/78 X |
| 4,010,703 | 3/1977 | Spiekermann | 113/120 Y |
| 4,055,133 | 10/1977 | Wessely | 113/120 Y |

FOREIGN PATENT DOCUMENTS 507553   12/1954   Italy ......................................... 29/463

Primary Examiner—Charlie T. Moon

[57] ABSTRACT

A metal tank for a liquid hydrocarbon and method of making same are provided wherein such tank has a first wall terminating in a first flange, a second wall terminating in a second flange, and an adhesive disposed between and bonding the flanges together with such adhesive being resistant to the liquid hydrocarbon and providing a liquid-tight seal between the walls; and, such first and second flanges are mechanically folded to define an interlocking mechanical joint which cooperates with the adhesive to provide the liquid-tight seal.

7 Claims, 8 Drawing Figures

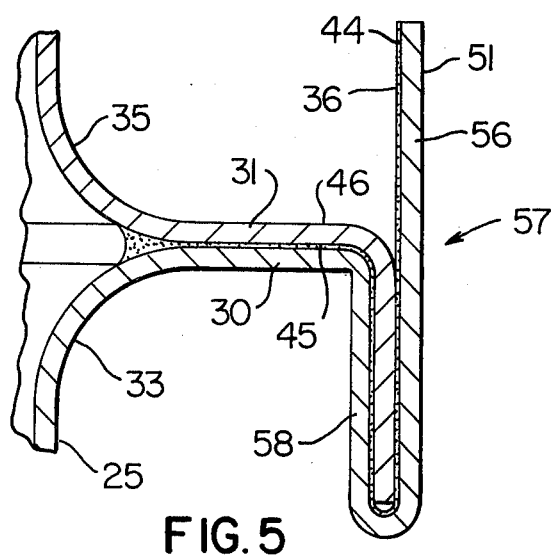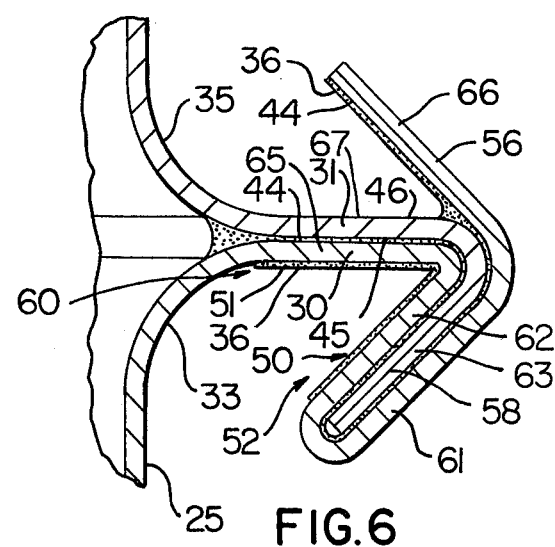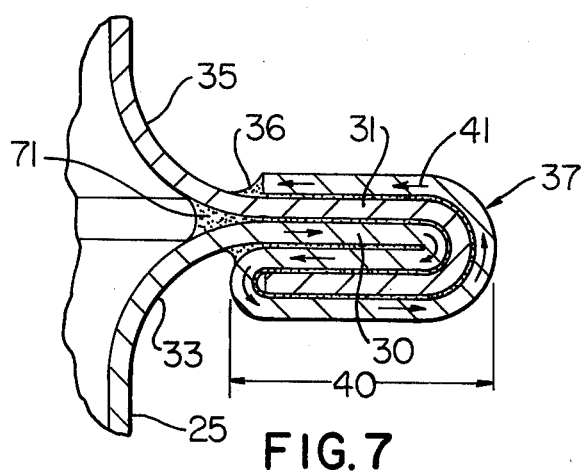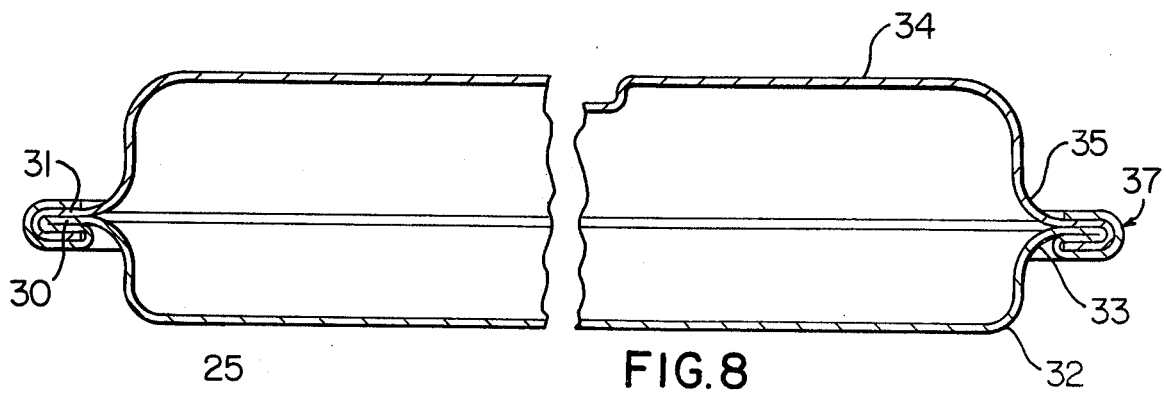

METHOD OF MAKING A TANK

BACKGROUND OF THE INVENTION

Metal tanks particularly of the type used as fuel tanks for motor vehicles, and the like, are generally made with their associated cooperating walls sealed together by metal joining processes such as welding, for example.

However, it is well known that the automobile industry is highly competitive and there are continuing efforts to reduce costs. Accordingly, because welding processes are inherently comparatively expensive it would be desirable to produce tanks of the character mentioned which are economical yet provide satisfactory performance.

In addition, because of the escalating costs of fuel for engines of motor vehicles there has been a more concentrated recent effort to provide as many components of such motor vehicles of comparatively lighter yet high performance materials whereby aluminous materials have gained wider acceptance in the making of fuel tanks of the character mentioned.

SUMMARY

This invention provides a metal tank for a liquid hydrocarbon and method of making same wherein such tank has a first wall terminating in a first flange, a second wall terminating in a second flange, and an adhesive disposed between and bonding the flanges together with such adhesive being resistant to the liquid hydrocarbon and providing a liquid-tight seal between the walls; and, such first and second flanges are mechanically folded to define an interlocking mechanical joint which cooperates with the adhesive to provide the liquid-tight seal.

Other details and advantages of the invention will become apparent as the following description of the embodiment thereof in the accompanying drawings proceeds.

BRIEF DESCRIPTION OF THE DRAWINGS

The accompanying drawings show a present preferred embodiment of the invention, in which

FIGS. 2, 3, 4, 5, 6, and 7 illustrate a series of sequential steps employed to define the joint provided in the tank of FIG. 1; and FIG. 8 is a cross-sectional view with the center portion thereof broken away taken essentially on the line 8—8 of FIG. 1.

DESCRIPTION OF ILLUSTRATED EMBODIMENTS

Figure 1:
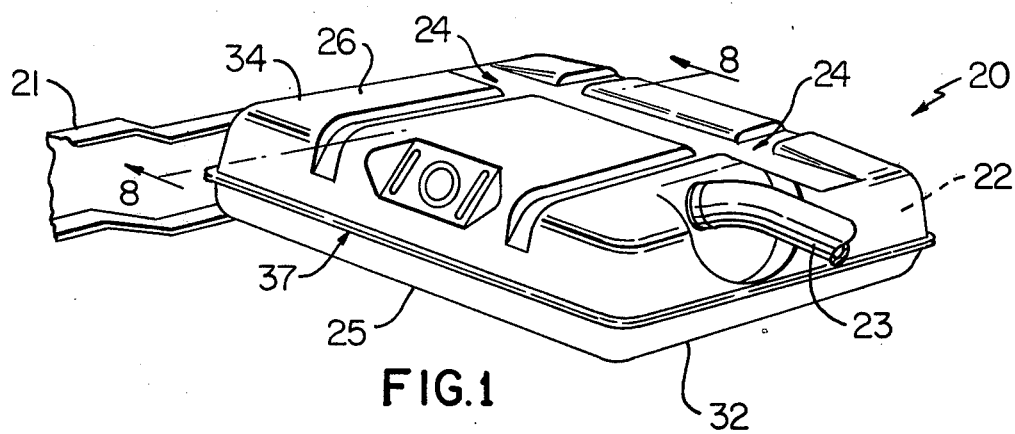
FIG. 1 is a perspective view of one exemplary embodiment of clamshell-type tank of this invention mounted on supporting structure therefor and wherein such tank has two opposed cup-like walls provided with cooperating peripheral flanges which are adhesively bonded and mechanically folded to define a peripheral interlocking, fluid-tight, mechanical joint for the walls of such tank.

Reference is now made to FIG. 1 of the drawings which illustrates one exemplary embodiment of a metal tank of this invention which is designated generally by the reference numeral 20 and such tank is illustrated as being supported on a fragmentary portion of a frame member 21 of a motor vehicle in a form of an automobile (not shown). The metal tank 20 is particularly adapted to contain a liquid hydrocarbon fuel 22 for the engine of such automobile; and, the tank 20 has a filler pipe 23 suitably connected thereto in a fluid-tight manner and has the usual components (also not shown) associated therewith for supplying fuel to such engine and indicating the amount of fuel in the tank. The tank 20 is provided with suitable mounting provisions such as integral channels 24 therein for receiving mounting straps used to mount the tank to associated structure.

The tank 20 is often popularly referred to as a clamshell-type tank and is basically comprised of a first wall in the form of a bottom wall 25 which defines the bottom half of the clamshell structure and a second wall in the form of a top wall 26 which defines the remaining or top half of the clamshell structure. The wall 25 is a cup-shaped or hat-shaped wall while the wall 26 is a similar though inverted cup-shaped or hat-shaped wall. Each of the walls 25 and 26 of this example has a roughly rectangular outer or peripheral outline when viewed in plan view and each wall is provided with smooth rounded corners about the periphery thereof to minimize stress concentrations. Each wall 26 and 26 may be suitably formed employing cooperating dies and a standard press and each wall 25 - 26 may be of any suitable metal gage or thickness. The walls 25 and 26 terminate in peripheral flanges 30 and 31 respectively.

The first wall or the bottom wall 25 has an outwardly convex main portion 32 and the flange 30 extends about the entire periphery of the wall 25 as an integral part thereof. The flange 30 is connected to the inner part of the main portion 32 by a smooth arcuate portion 33 of wall 25. The wall 25 with its main portion 32, arcuate portion 33, and peripheral flange 30 are preferably defined as a single-piece structure and the peripheral flange 30 is defined as a sheet-like flange.

The second wall or top wall 26 also has an outwardly convex main portion 34 and the flange 31 extends about the entire periphery of the wall 26 as an integral part thereof. The flange 31 is connected to the inner part of the main portion by a smooth arcuate portion 35 of wall 26. The wall 26 with its main portion 34, arcuate portion 35 and peripheral flange 31 are preferably defined as a single-piece structure and the peripheral flange is defined as a sheet-like flange.

Referring to FIG. 7 of the drawings, it is seen that the tank 20 has adhesive means in the form of an adhesive 36, an example of which will be described in detail subsequently, disposed between and bonding the flanges 30 and 31 together. The adhesive means or adhesive 36 is resistant to the liquid hydrocarbon 22 provided in the tank 20 thereby assuring the provision of a liquid-tight seal between the walls 25 and 26 of the clamshell construction by providing a liquid-tight seal between the flanges 30 and 31 thereof.

Figure 2:
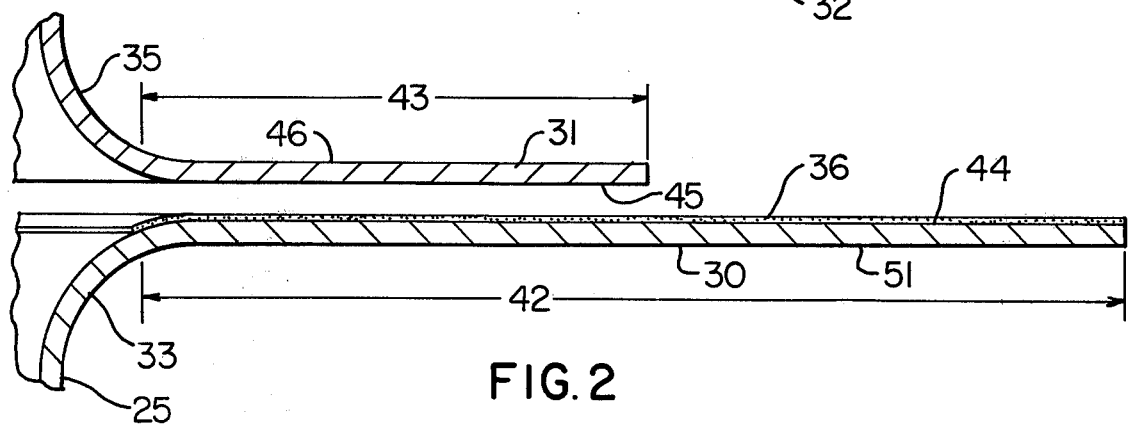
Figure 3:
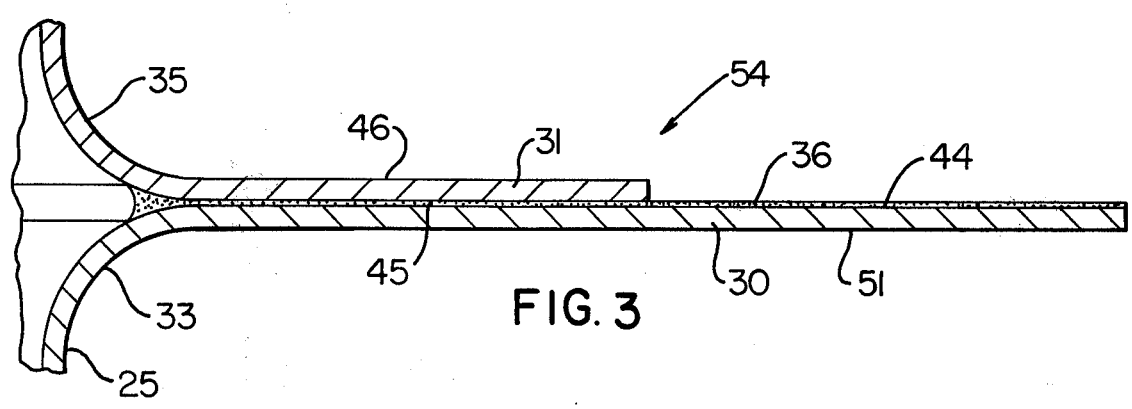
Figure 4:
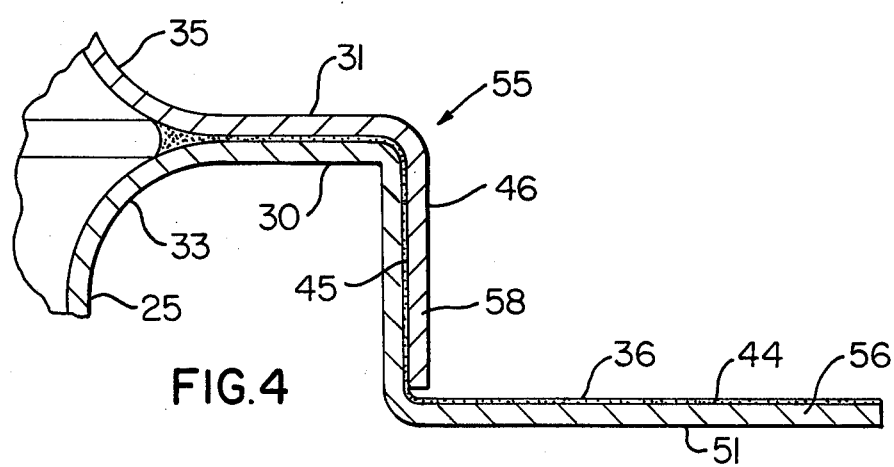

The integral flanges 30 and 31 are initially planar as seen in FIGS. 2 and 3 and such flanges have adhesive 36 disposed therebetween and are mechanically folded as shown in FIGS. 4-7 to define an interlocking mechanical joint in the form of a six layer or six thickness joint 37, as illustrated in FIG. 7. The mechanical interlocking folding of flanges 30 and 31 in cooperation with the adhesive 36 provide the previously mentioned liquid-tight seal of the liquid hydrocarbon 22 contained in the tank 20. The six layer mechanical joint 37 is disposed closely adjacent the periphery of the tank 20 and has a lateral peripheral extension as illustrated at 40. The construction is such that with the flanges 30 and 31 folded and interlocked it is very difficult for liquid hydrocarbon to seep or leak through the joint 37. In particular, in order to leak through joint 37 it is necessary for liquid hydrocarbon 22 to leak through an interface between flanges 30 and 31 which is roughly four times the length of the extension 40. In addition, for leaking to normally occur the liquid hydrocarbon must travel through a complex winding path as indicated by arrows 41 in FIG. 7.

Referring again to FIG. 2, it is seen that the flange 30 has a length 42 which is approximately twice the length 43 of the flange 31. The adhesive 36 is disposed on a surface 44 of the flange 30 as a layer thereof and such layer of adhesive 36 is adapted to engage the flange 31. The flange 31 has opposed surfaces 45 and 46 and as seen in FIGS. 3-6 the interlocking mechanical joint is defined by roughly one half of the flange 30 and its adhesive 36 disposed on one surface, i.e., surface 45, of the flange 31 and the remaining portion of flange 30 and its associated adhesive 36 disposed on the other surface, i.e., surface 46, of the flange 31.

The flange 31 has a second layer of adhesive means 36, as shown at 50 in FIG. 6, disposed against a surface 51 of the flange 30 opposite from the surface 44 thereof and the second layer of adhesive 36 at 50 extends along roughly half of the length of the first flange 30. The flange 30 is folded so that one half of the adhesive layer at 50 is also bi-folded and the commencement of the bi-folding action is illustrated at 52 in FIG. 6 with the completion of such bi-folding action being illustrated as the completed six layer or six thickness joint 37 in FIG. 7.

The method of forming the clamshell-type tank 20 will be readily understood from the drawings and in particular from FIGS. 2-7 thereof. In particular, it is seen that the method includes the steps of forming a first tank wall 25 terminating in a first sheet-like peripheral planar-flange 30 with the wall 30 having an outwardly convex main portion 32; and, forming a second tank wall 26 terminating in a second sheet-like peripheral planar flange 31 with the wall 26 having an outwardly convex main portion 34. The flange 30 is formed so that it is approximately twice the length of the flange 31.

The method also includes the steps of applying adhesive means in the form of a suitable adhesive 36 at selected locations between flanges 30 and 31 and then mechanically folding such flanges 30 and 31 to define an interlocking mechanical joint which cooperates with the adhesive 36 to provide a liquid-tight seal for liquid hydrocarbon 22 contained in the completed and filled tank 20.

The mechanically folding step comprises disposing roughly one half of the flange 30 and its associated adhesive means on the surface 45 of the flange 31 and as shown at 54 in FIG. 3 and disposing the remaining portion of the flange 30 and its associated adhesive means on the surface 46 of the flange 31. The step of disposing the remaining portion of the flange 30 on the surface 46 is achieved in a plurality of steps whereby initially flange 31 with about half of flange 30 adhered thereto is folded or bent to define an L-shaped double-thickness portion 55 (FIG. 4) with the remaining single-thickness portion 56 of flange 30 disposed outwardly of the flange 31 being bent or folded perpendicular to the terminal end of a double-thickness leg 58 of the L-shaped portion to define a roughly Z-shaped structure. The single thickness outer part 56 of the flange 30 is then folded vertically against the double-thickness leg 58 as shown at 57 in FIG. 5.

The method also includes the step of applying another layer of adhesive means or adhesive 36 as shown at 50 in FIG. 6 against a part of the surface 51 of the flange 30 opposite from the surface 44 of flange 30. The layer 36 of adhesive means at 50 extends from the base of the flange 30 as shown at 60 along roughly one half the length of flange 30; and, such half length (indicated by the V-shaped configuration of such half length at the lower part of the partially completed joint 37 in FIG. 6) is then bi-folded together with structure adjoining same to define the joint illustrated in FIG. 7 which has a plurality of six thicknesses. It will be appreciated that the adjoining structure referred to comprises portions 61 and 62 of flange 30 together with portion 63 of flange 31 comprising half of the joint 37 and portions 65 and 66 of the flange 30 together with portion 67 of flange 31 comprising the other half of the joint 37. It will be noted that the inner portion of surface 51 is, in essence, bi-folded against itself with adhesive 36 interposed therebetween.

In order to control and to assure the provision of a minimum thickness of adhesive 36, suitable spacing means may be provided between adjoining portions, i.e., at the interfaces, of the flanges 30 and 31. Any suitable spacing means known in the art may be employed as long as such spacing means is compatible with the adhesive 36. For example, glass particles, in the form of either glass thread or glass beads, may be used. The adhesive 36 is shown generally in the drawings with dots to indicate the adhesive material. A few representative dots have also been designated by the reference numeral 71 in FIG. 7 to indicate the spacing means or glass particles referred to.

The tank 20 of this invention may be made of any suitable metallic material including ferrous and aluminous materials and alloys thereof. However, tank 20 is preferably made of aluminous materials.

Any suitable adhesive means or adhesive 36 known in the art may be employed. One example of an adhesive which has been used successfully is in the form of a modified epoxy resin sold by American Cyanamid Company of Wayne, N.J. 07470, under the registered trademark "CYBOND" 4533-Industrial Adhesive.

However, it will be appreciated that other suitable adhesive means may be used including vinyls, vinyl plastisols, polyesters, polyurethanes, two part polysulfides, and the like.

Terms such as top wall, bottom wall, and the like have been used in this disclosure to describe walls as illustrated in the drawings. However, it is to be understood that these terms and any similar terms are not to be considered limiting in any way inasmuch as the tank of this invention may be oriented in any desired manner.

While present embodiments of this invention, and methods of practicing the same, have been illustrated and described, it will be recognized that this invention may be otherwise variously embodied and practiced within the scope of the following claims.

What is claimed is:

1. A method of making a metal tank for a liquid hydrocarbon comprising the steps of, forming a first tank wall terminating in a first flange, forming a second tank wall terminating in a second flange, said first flange being approximately twice the length of said second flange, applying a layer of adhesive means which is resistant to said liquid hydrocarbon as a layer thereof against one entire surface of said first flange, applying another layer of adhesive means against the surface of said first flange opposite from said one surface of said first flange, said other layer of adhesive means extending from the base of said first flange along roughly half its length, mechanically folding said first and second flanges to define an interlocking mechanical joint which cooperates with said layer of adhesive means to provide a liquid tight seal, said mechanical folding step comprising disposing roughly one half of said first flange and its associated adhesive means on one surface of said second flange and disposing the remaining portion of said first flange and its associated adhesive means on the surface of said second flange opposite from said one surface and bifolding said half length and adjoining structure during said mechanically folding step to define said joint having a plurality of six thicknesses.

2. A method as set forth in claim 1 in which each of said forming steps comprises forming each tank wall and its flange as a sheet-like planar peripheral flange.

3. A method as set forth in claim 2 in which each of said forming steps comprises forming each wall and its flange from a single-piece of sheet material.

4. A method as set forth in claim 3 in which each of said forming steps comprises forming each wall and its flange employing cooperating dies and a standard press.

5. A method as set forth in claim 1 in which said mechanically folding step comprises the intermediate step of folding said flanges into a Z-shaped construction.

6. A method as set forth in claim 3 in which each of said forming steps comprises forming each wall and its flange using aluminous sheet material.

7. A method as set forth in claim 3 in which said mechanically folding step comprises defining said joint substantially in a plane roughly midway between outer opposed surfaces of said first and second walls.

* * * * *

UNITED STATES PATENT OFFICE
CERTIFICATE OF CORRECTION

Patent No. 4,131,980            Dated    January 2, 1979

Inventor(s) Frederick W. Zinnbauer

It is certified that error appears in the above-identified patent and that said Letters Patent are hereby corrected as shown below:

On the Title page, Item [73] should read:

Assignee: Reynolds Metals Co.,
              Richmond, Virginia

Signed and Sealed this

Eighth Day of May 1979

[SEAL]

*Attest:*

RUTH C. MASON
*Attesting Officer*

DONALD W. BANNER
*Commissioner of Patents and Trademarks*